US006799035B1

(12) United States Patent
Cousins

(10) Patent No.: US 6,799,035 B1
(45) Date of Patent: Sep. 28, 2004

(54) APPARATUS AND PROCESS FOR SENDING A WIRELESS DIRECTIONAL SIGNAL CONTAINING PERSONAL INFORMATION

(76) Inventor: Jeffrey Cousins, 2728 Haring St., Brooklyn, NY (US) 11235

(*) Notice: Subject to any disclaimer, the term of this patent is extended or adjusted under 35 U.S.C. 154(b) by 499 days.

(21) Appl. No.: 09/660,004

(22) Filed: Sep. 12, 2000

(51) Int. Cl.⁷ .............................................. H04M 3/00
(52) U.S. Cl. ................ 455/418; 455/412.2; 455/414.1; 455/403; 340/5.2; 340/5.8; 235/375
(58) Field of Search ............................. 455/418, 422.1, 455/414.1, 517, 403, 412.1, 567, 556.1, 550.1; 340/5.2–5.8; 235/375

(56) References Cited

U.S. PATENT DOCUMENTS

| | | | | |
|---|---|---|---|---|
| 4,173,016 A | * | 10/1979 | Dickson ...................... 342/42 |
| 5,086,394 A | * | 2/1992 | Shapira ......................... 705/1 |
| 5,216,419 A | * | 6/1993 | Fujisaka et al. .......... 340/10.52 |
| 5,797,085 A | * | 8/1998 | Beuk et al. .................... 455/88 |
| 5,898,683 A | * | 4/1999 | Matsumoto et al. ........ 370/338 |
| 5,907,418 A | * | 5/1999 | Walczak et al. ............ 398/106 |
| 5,920,845 A | * | 7/1999 | Risemberg ..................... 705/1 |
| 5,940,006 A | * | 8/1999 | MacLellan et al. ........ 340/10.1 |
| 6,038,290 A | * | 3/2000 | Katada ....................... 379/56.3 |
| 6,078,816 A | | 6/2000 | Weiss et al. |
| 6,411,804 B1 | * | 6/2002 | Isomichi et al. ............ 455/403 |
| 6,445,688 B1 | * | 9/2002 | Garces et al. ............... 370/334 |
| 2001/0016487 A1 | * | 8/2001 | Hiatt, Jr. .................. 455/422.1 |
| 2001/0041590 A1 | * | 11/2001 | Silberfenig et al. ......... 455/556 |
| 2002/0065065 A1 | * | 5/2002 | Lunsford et al. ........... 455/411 |
| 2002/0102971 A1 | * | 8/2002 | Jayaraman ................... 455/422 |

OTHER PUBLICATIONS

Advertisement from Accessory Store/Palm PDA's, CYBIKO, from Internet, 2 pages.

* cited by examiner

Primary Examiner—William Trost
Assistant Examiner—Sharad Rampuria
(74) Attorney, Agent, or Firm—Collard & Roe, P.C.

(57) ABSTRACT

The invention relates to an apparatus and a method for wirelessly transmitting a packet of information from one user to another user. The apparatus relates to a transponder device that contains a controller, and a memory unit, that contains a program for controlling the controller. The transponder also contains a transceiver connected to both the controller and to a directional antenna wherein the transceiver is for receiving and transmitting wireless signals from one transponder to another. There is also a button for initiating a wireless transmission, a display for displaying a received transmission and an indicator for indicating a user when he or she has received a transmission. Essentially this device is designed to transmit and receive email addresses from one user to another in a defined area. The user transmitting the email address uses the directional antenna to direct the email address at another person who is also holding a transponder. The user then presses the button and sends this wireless transmission to the other user whereby this user receives an indication from an indicator that the transmission has been received. Next the user that received this message can look at the display to see the email address that was most recently transmitted.

20 Claims, 6 Drawing Sheets

APPARATUS AND PROCESS FOR SENDING A WIRELESS DIRECTIONAL SIGNAL CONTAINING PERSONAL INFORMATION

BACKGROUND OF THE INVENTION

1. Field of the Invention

The invention relates to a method and an apparatus for the wireless transmission of information from one user to another. More particularly, the invention relates to a method and an apparatus for the wireless transmission of an email address from one user to another.

SUMMARY OF THE INVENTION

The invention relates to an apparatus and a method for wirelessly transmitting a packet of information from one user to another. The apparatus relates to a transponder device for wireless interaction with another user. The transponder device is disposed within a housing such as a pen or a cellular phone. If the transponder is disposed within the cellular phone, the electronic components of the cellular phone work in cooperation with the electronic components of the transponder. Disposed within the housing is a controller or processor, and a memory unit connected to the controller. The memory unit stores a program for controlling the controller that runs the transponder. There is also a transceiver for receiving and transmitting wireless signals from the first transponder to the second transponder. There is also a display, preferably a LCD display, connected to the controller wherein the display displays information that is received by the transponder. The transponder also contains a directional antenna that transmits at approximately 900 Mhz and is designed to transmit signals in a particular direction. In this way, the user holding the transponder can direct his or her transponder toward another individual to send a packet of information to only that individual. The range of this transponder is approximately 100 meters so that this signal is not transmitted to individuals outside the viewing range of the user transmitting the signal.

The transponder also contains a signal initiator, which can be in the form of a button or voice-activated switch, wherein when the signal initiator is activated, the device sends the packet of information through the transceiver on through the directional antenna to another transponder device for reception. This packet of information relates to identification information in the form of an email address or even a user's name. The packet of information can also include the time and date of the transmission.

The receiving transponder receives this packet of information and stores this information in the memory unit of the receiving transponder. Once this information has been received, an indicator disposed on the transponder indicates when the transponder device receives the packet of information from another transponder device. Here the indicator is a vibrating mechanism designed to vibrate the transponder device when the transponder device receives this packet of information. The indicator could also be a noise maker, which makes an indicating noise when the transponder device receives this packet of information. The indicator could also be a visual indicator designed to send a visual signal when the transponder device receives this packet of information.

In addition, so that non participating transponders do not receive signals that are transmitted, the controller applies a code to the packet of information so that only transponder devices that are participating with the transponder device sending information receive this packet of information. Once this packet of information has been received, the information is transmitted through an input/output terminal designed to allow information stored in the memory unit to be downloaded or uploaded to an adjacent computer for viewing. In this case, if a user receives an email address sent from another user, this email address can be downloaded into that user's computer. This input/output connection can be either a wireless, or a wired connection with the adjacent computer so that information can be sent into the adjacent computer.

This transponder device also sends a packet of information via wireless transmission from a first user, having a transponder device, to a second user having an additional transponder device. This process includes the steps of pointing the transponder device of the first user in a direction of the second user holding an additional transponder device. Next, the transponder wirelessly transmits a packet of information to the additional transponder device. The additional transponder device then stores this packet of information. This additional transponder device then indicates receipt of the packet of information. In this step, the additional transponder device can show this receipt by either emitting a vibration sensation in the transponder, signaling a noise or emitting a visual indicator such as a light from the transponder to let the second user know that he or she has received the packet of information.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1A:
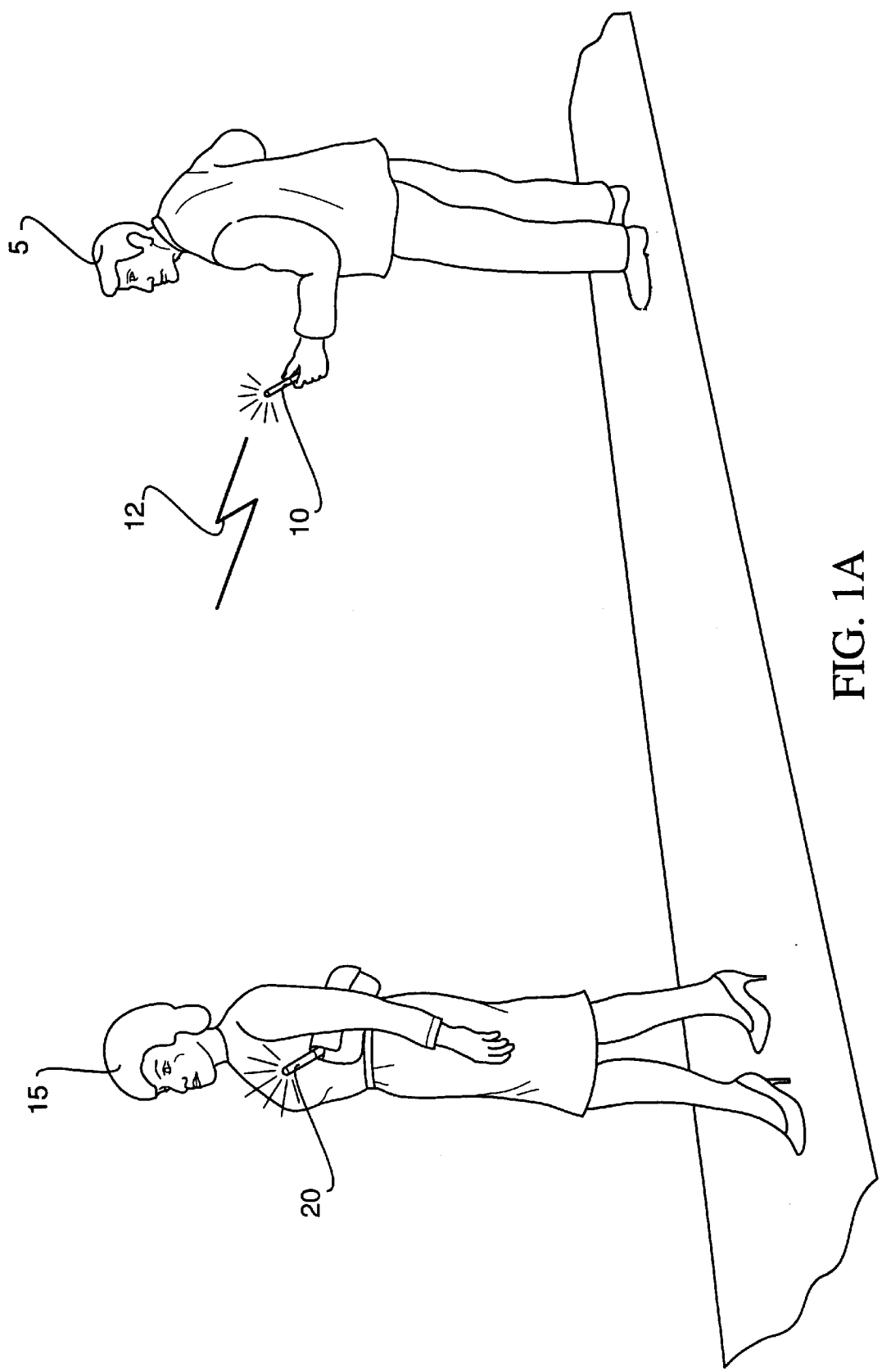
FIG. 1A is a view of two different people each using the transponder device.

Referring in detail to the drawings, FIG. 1A is a perspective view of two different users each using the invention, wherein a first user 5 is holding a first transponder device 10 and transmits a packet of information 12 to a second user 15 holding a second transponder device 20. In the preferred embodiment of the invention, this packet of information is the email address of the first user, and includes the time and date that this email was sent.

Figure 1B:
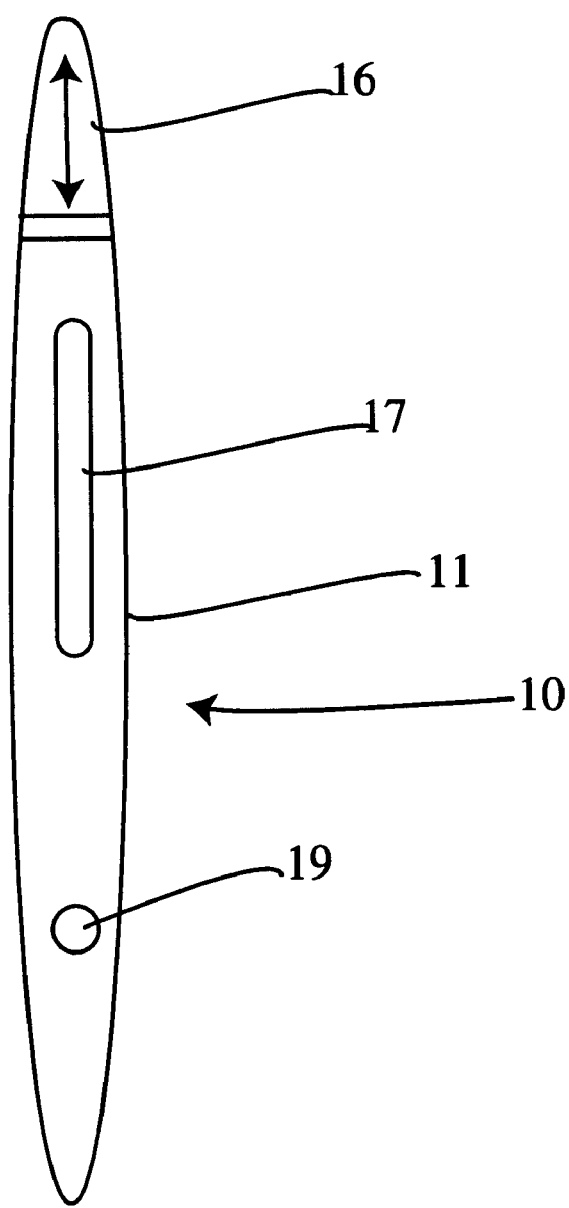
FIG. 1B is a perspective view of the first embodiment of the apparatus portion of the invention.

FIG. 1B is a perspective view of the first embodiment of the invention showing a transponder 10 that is disposed within a pen housing 11, containing a button 16 that is used to initiate the process for sending a packet of information via wireless transmission. This pen housing also contains a display 17, preferably a LCD display that is used to display a packet of information received by transponder 10. Transponder 10 can then download this information to a personal computer via an input/output device 18 (see FIG. 2) that uploads or downloads information wirelessly or uses a connection 19 to establish a wired connection with a personal computer.

Figure 2:
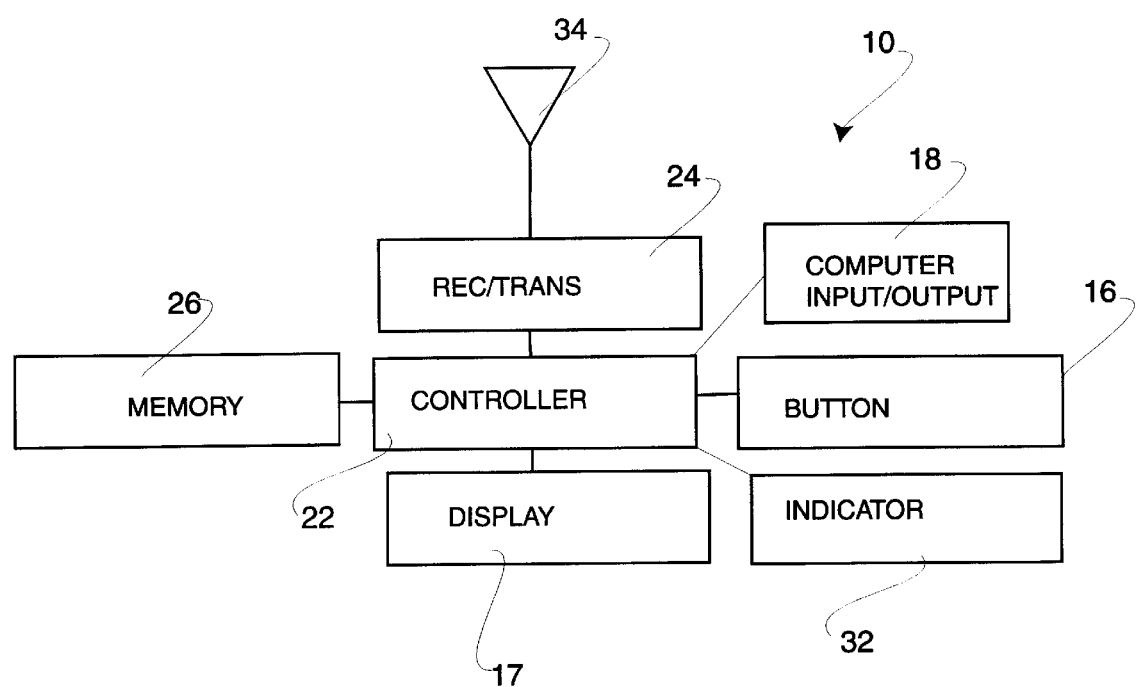
FIG. 2 is a block diagram that represents an electronic component portion of the first embodiment of the apparatus portion of the invention.

FIG. 2 is a block diagram of the electronic components of the first embodiment of the invention. Here, the components of the wireless system include a controller 22, a transceiver 24 connected to the controller 22, and a computer input/output device 18 connected to controller 22. In addition, there is a display 17 that is preferably designed as a LCD display that displays information that is transmitted to and from transponder 10. There is also a memory unit 26 that is connected to controller 22 wherein memory unit 26 contains a program for instructing controller 22 through a series of steps (See FIG. 6) to send an email address to another user.

Transponder 10 also contains a directional antenna 34 that is designed to emit a signal from transceiver 24 and send this directional signal to an adjacent user so that the adjacent user receives a packet of information that contains the user's email address. Directional antenna 34 is designed so that it is only directional in transmitting the signal. Antenna 34 is designed to be omni-directional in its reception of signals so that signals transmitted to directional antenna 34 can be received at any angle. Once this information has been received, it can be displayed on display 17. In addition, transponder 10 also contains an indicator 32, which in a preferred embodiment, is a vibrating element that vibrates the transponder housing 11, so that when transponder 10 receives a signal, the transponder then indicates by vibrating that transponder 10 has received this signal. In addition the indicator could also be in the form of a light, or in the form of a noise maker such as a beeper. Transponder 10 also contains a directional antenna 34 for transmitting a directional signal to another user so that only that user receives the signal for the email. For example, if a first user has a transponder 10 and sees a second user across a park that the first user wants to meet, first user 5 (FIG. 1A) points his transponder 10 at second user 15 and presses button 16 (FIG. 1B) to send a transmission containing the packet of information. Second user 15 (FIG. 1A) who has second transponder 20 receives this transmission into antenna 34 (FIG. 2) and stores this transmission into memory 26. Next, controller 22 sends a signal to indicator 32 telling indicator 32 to signal user 15 (FIG. 1A). In the preferred embodiment indicator 32 (FIG. 2) is a vibrating mechanism wherein when transponder registers receipt of this transmission, indicator 32 vibrates transponder 20 (FIG. 1A) to let second user 15 know that a message has been received.

Figure 3:
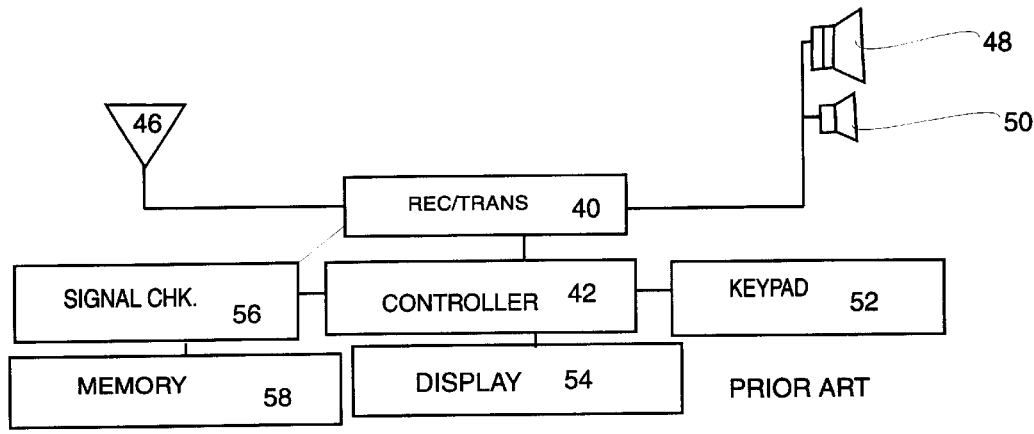
FIG. 3 is a block diagram that represents a prior art design for a cellular phone.

FIG. 3 shows the arrangement of a cellular phone according to U.S. Pat. No. 6,078,816 incorporated herein by reference. This design of a cellular phone represents any type of cellular phone that could be adapted to include transponder 10 connected thereto. With this design, there is a transceiver 40 connected to a controller 42. Transceiver 40 also connects to cellular antenna 46 and audio input and output ports 48 and 50. A keypad 52 is also connected to controller 42 along with a display 54, and a signal checking device 56. Signal checking device 56 is designed to check whether a cellular transmission or reception is possible from a user's location. There is also a memory unit 58 connected to signal checking device 56 wherein memory unit 58 stores a program designed to run controller 42 and also store additional phone numbers stored in memory.

Figure 4:
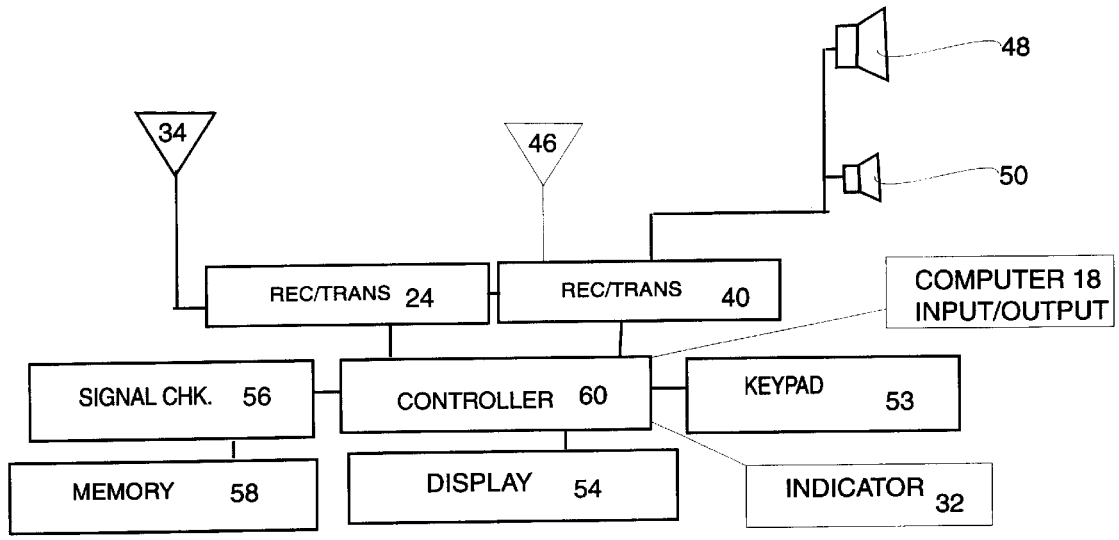
FIG. 4 is a block diagram that represents the second embodiment of the apparatus portion of the invention.
Figure 5:
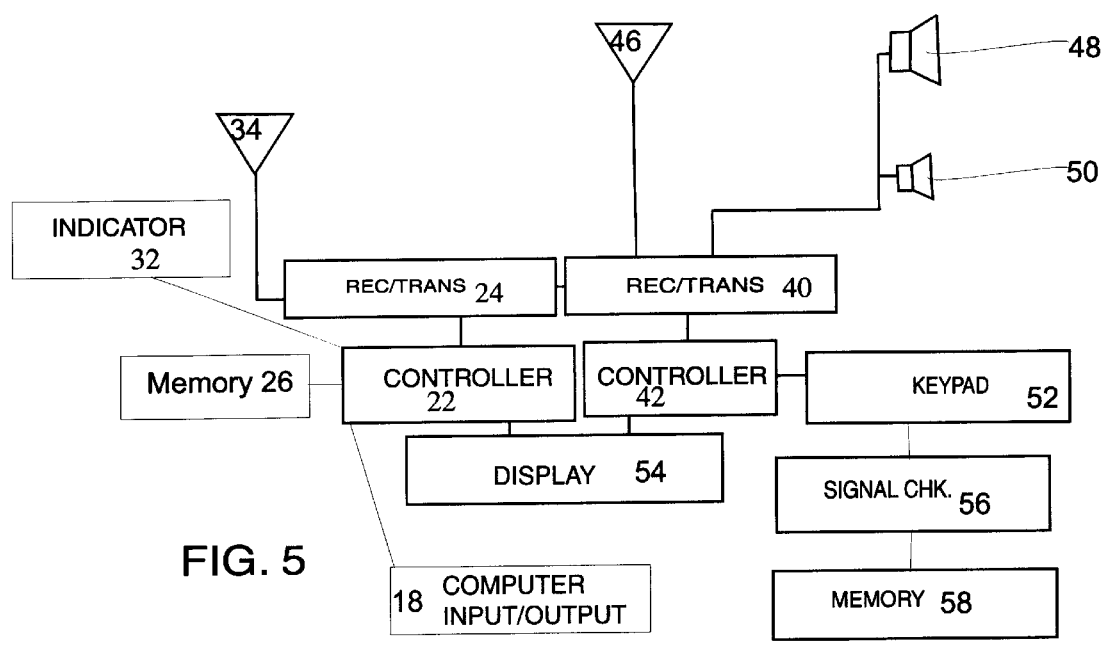
FIG. 5 is a block diagram that represents the fourth embodiment of the invention.

FIG. 4 shows the adaptation of the prior art shown in FIG. 3 wherein there is an additional transceiver 24 that is connected to controller 60 that is designed to perform the functions of both controller 42 (See FIG. 3) and controller 22 (See FIG. 5). Transceiver 24 also connects to antenna 34. Indicator 32, as shown in FIG. 2, also connects to controller 60 while memory unit 58 is similar to that shown in FIG. 3. In this case, memory unit 58 stores information relating to a cellular phone and information relating to transponder 10. There is also a computer input/output port 18 that is connected to controller 60 to allow information from memory 58 to be uploaded or downloaded to an adjacent computer. Display 54 remains the same as shown in FIG. 3 wherein this display is a standard display for all cellular phones. Finally, keypad 53 remains substantially similar to keypad 52 as shown in FIG. 3. However, this keypad contains a button that acts as a signal initiator which starts the process shown in FIG. 6 for sending a transmission.

FIG. 5 is an alternative embodiment of the invention, wherein there are shown two different transceivers 24 and 40 each individually connected to different controllers 42 and 22. In addition, there are two different memory units 26 and 58. The information stored in memory unit 26 relates to a program designed to run controller 22, and any received email information. With this design, indicator 32, and computer input/output 18 are electronically attached to controller 22 allowing the internal components of transceiver 10 to be substantially separate from the internal components of a cellular phone shown in FIG. 4. In this way, the internal components of transceiver 10 can be added to a cellular phone after all of the components of the cellular phone have been connected.

Figure 6:
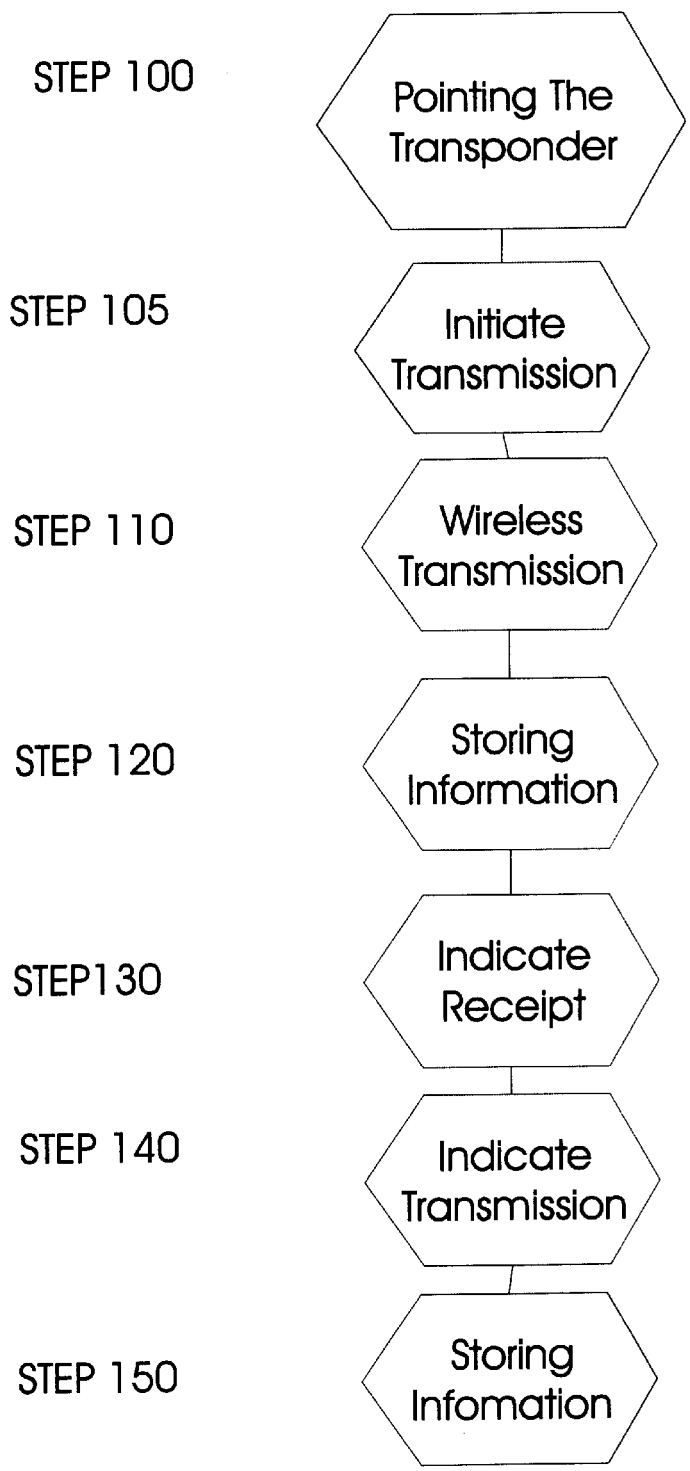
FIG. 6 is a flow chart of the method portion of the invention.

FIG. 6 is a flow chart detailing the computer process for wirelessly transmitting a signal from one user to another user. This process can be performed with the embodiments shown in FIGS. 2, 4 and 5. The process starts with step 100 wherein as shown in FIG. 1 a user 5 points transponder 10 at a second user 15 so that second user 15 can receive a packet of information such as an email address. Next, in step 105, user 5 presses button 16 to initiate the wireless transmission of this email address. However, before the email address is sent, it is encrypted using controller 22 so that only participating users will receive this email. In addition, this transmission is preferably sent at 900 MHz. In step 110, this email address is then transmitted. Next, in step 120, second user 15 receives this information and which is then stored in memory unit 26, in transponder 20. Next, in step 130, controller 22 signals indicator 32 to indicate the receipt of the transmission. Next, in step 140, transponder 20 sends a signal back to transponder 10 to indicate that this packet of information such as an email address has been received. Finally, in step 150, this confirmation is stored in memory 26 in transponder 10 of user 5.

In this way, the transponder and the method create a way for two people to meet anonymously and to potentially interact. Once second user 15 downloads this email address, second user 15 can email first user 5 over a computer network for further interaction. Thus, both the device and the method create a novel way for two strangers to meet.

Accordingly, while several embodiments of the present invention have been shown and described, it is to be understood that many changes and modifications may be made thereunto without departing from the spirit and scope of the invention as defined in the appended claims.

What is claimed is:

1. A portable transponder device for wireless interaction with another user's portable transponder comprising:
   a) a housing;
   b) at least one controller disposed within said housing;
   c) at least one memory unit connected to said at least one controller, for housing at least one program designed to control said at least one controller;
   d) at least one display connected to said at least one controller;
   e) at least one transceiver, connected to said at least one controller, for receiving and transmitting wireless signals;
   f) at least one directional antenna, connected in said transceiver, for sending a directional signal to the another user;
   g) at least one signal initiator, wherein when said signal initiator is activated, the device sends a packet of information in a form of an email address through said at least one transceiver on through said directional antenna, to another portable transponder device for reception wherein said portable transponder device is for interpersonal communication between a first user an a selected second user to convey information between said first and said selected second user.

2. The portable transponder device as in claim 1, wherein said at least one controller sends indentification information with said packet of information to said at least one transceiver to send this information to another user.

3. The portable transponder device as in claim 2, wherein said at least one controller sends time and date information with said packet of information to said at least one transceiver to send this information to another user.

4. The portable transponder device as in claim 1, wherein said directional antenna transmits a signal at approximately 900 Mhz.

5. The portable transponder device as in claim 1, wherein the portable transponder device has a range of no more than 100 meters.

6. The portable transponder device as in claim 1, wherein said display is an LCD display.

7. The portable transponder device as in claim 1, wherein said at least one memory unit is designed to store a series of email addresses received from an adjacent portable transponder device.

8. The portable transponder device as in claim 1, wherein said at least one controller applies a code to said packet of information so that only a series of transponder device that are in co-operation with the portable transponder device sending information receive said packet of information.

9. The portable transponder device as in claim 1, further comprising an input/output terminal designed to allow information stored in said at least one memory unit to be download or upload to an adjacent computer.

10. The portable transponder device as in claim 9, wherein said input/output device is a wireless connection with said adjacent computer.

11. The portable transponder device as in claim 9, wherein said input/device is a wired connection with said adjacent computer.

12. The portable transponder device as in claim 11, wherein said input/output device is a serial connection with said adjacent computer.

13. The portable transponder device as in claim 1, further comprising an indicator to indicate when the portable transponder device receives said packet of information from another portable transponder device.

14. The portable transponder device as in claim 13, wherein said indicator is a vibrating mechanism designed to vibrate the portable transponder device when portable the transponder device receiver said packet of information.

15. The portable transponder device as in claim 13, wherein said indicator is a noise maker, that makes an indicating noise when the portable transponder device receives said packet of information.

16. The portable transponder device as in claim 13, wherein said indicator is a visual indicator designed to send a visual signal when the portable transponder device receives said packet of information.

17. The portable transponder device as in claim 16, wherein said visual indicator is enclosed in said at least one display.

18. The portable transponder device as in claim 1, wherein said housing is pen shaped.

19. The portable transponder device as in claim 1, wherein said housing is a cellular phone housing.

20. The portable transponder device as in claim 19, wherein said transponder device is connected to a set of electrical components of a cellular phone.

* * * * *